(12) United States Patent
Choi et al.

(10) Patent No.: US 10,717,868 B2
(45) Date of Patent: Jul. 21, 2020

(54) POLYAMIDE/POLYPHENYLENE ETHER RESIN COMPOSITION, AND VEHICLE MOLDED PRODUCT PREPARED THEREFROM

(71) Applicant: LOTTE ADVANCED MATERIALS CO., LTD., Yeosu-si (KR)

(72) Inventors: Won Young Choi, Uiwang-si (KR); Doo Young Kim, Uiwang-si (KR); Kyun Ha Ban, Uiwang-si (KR); Chang Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 89 days.

(21) Appl. No.: 16/066,764

(22) PCT Filed: Nov. 17, 2016

(86) PCT No.: PCT/KR2016/013243
§ 371 (c)(1),
(2) Date: Jun. 28, 2018

(87) PCT Pub. No.: WO2017/116004
PCT Pub. Date: Jul. 6, 2017

(65) Prior Publication Data
US 2019/0016888 A1   Jan. 17, 2019

(30) Foreign Application Priority Data
Dec. 31, 2015  (KR) .................... 10-2015-0191446

(51) Int. Cl.
| | | |
|---|---|---|
| *C08L 77/06* | (2006.01) | |
| *C08L 71/12* | (2006.01) | |
| *C08K 5/13* | (2006.01) | |
| *C08J 3/20* | (2006.01) | |
| *C08K 5/092* | (2006.01) | |
| *C08J 3/00* | (2006.01) | |
| *C08L 23/02* | (2006.01) | |
| *C08L 25/06* | (2006.01) | |
| *C08L 77/02* | (2006.01) | |
| *C08K 5/20* | (2006.01) | |
| *C08L 53/02* | (2006.01) | |
| *C08K 7/06* | (2006.01) | |
| *C08K 3/04* | (2006.01) | |
| *C08K 5/00* | (2006.01) | |
| *C08K 3/013* | (2018.01) | |

(52) U.S. Cl.
CPC .............. *C08L 77/06* (2013.01); *C08J 3/005* (2013.01); *C08J 3/201* (2013.01); *C08J 3/203* (2013.01); *C08K 5/092* (2013.01); *C08K 5/13* (2013.01); *C08L 23/02* (2013.01); *C08L 25/06* (2013.01); *C08L 71/12* (2013.01); *C08L 77/02* (2013.01); *C08J 2377/06* (2013.01); *C08J 2425/04* (2013.01); *C08J 2471/12* (2013.01); *C08K 3/013* (2018.01); *C08K 3/04* (2013.01); *C08K 5/005* (2013.01); *C08K 5/20* (2013.01); *C08K 7/06* (2013.01); *C08K 2201/001* (2013.01); *C08L 53/025* (2013.01)

(58) Field of Classification Search
CPC .... C08L 79/02; C08L 71/12; C08L 77/02–10; C08L 2205/035
See application file for complete search history.

(56) References Cited

U.S. PATENT DOCUMENTS

| | | | |
|---|---|---|---|
| 7,022,777 B2 | 4/2006 | Davis et al. | |
| 7,393,895 B2 | 7/2008 | Davis et al. | |
| 2009/0030141 A1* | 1/2009 | Balfour ................. | C08J 3/226 524/578 |
| 2010/0081731 A1 | 4/2010 | Ting | |
| 2013/0280532 A1 | 10/2013 | Balfour et al. | |

FOREIGN PATENT DOCUMENTS

| | | |
|---|---|---|
| JP | 3385774 B2 | 3/2003 |
| JP | 2005-281616 A | 10/2005 |
| KR | 10-2015-0101761 A1 | 9/2015 |
| WO | 03/002667 A2 | 1/2003 |
| WO | 2015/049635 A1 | 4/2015 |
| WO | 2017/116004 A1 | 7/2017 |

OTHER PUBLICATIONS

International Search Report in counterpart International Application No. PCT/KR2016/013243 dated Feb. 20, 2017, pp. 1-4.
Campbell et al., "Poly(Phenylene Oxide)/Polyamide Blends via Reactive Extrusion", Polymer Engineering and Science, Mid-Sep. 1990, vol. 30, No. 17, pp. 1056-1062.

\* cited by examiner

*Primary Examiner* — Ana L. Woodward
(74) *Attorney, Agent, or Firm* — Additon, Higgins & Pendleton, P.A.

(57) ABSTRACT

The present invention relates to a polyamide/polyphenylene ether resin composition containing: a base resin comprising polyphenylene ether, a polyamide and an impact modifier; a compatibilizer; and a polyamine, and to: a polyamide/polyphenylene ether resin composition having a notched Izod impact strength of about 12 kJ/m$^2$ or more when measured at 23° C. according to the ISO 180 standard, and a number of checkerboard lattices, in which peeling off occurs, being about 5% or less of the total number of checkerboard lattices in a 1 mm-gap checkerboard pattern test for testing adhesion to acrylic paints and melamine-based paints according to the JIS K5600-5-6 standard; and a preparation method therefor.

18 Claims, 1 Drawing Sheet

[FIG. 1]
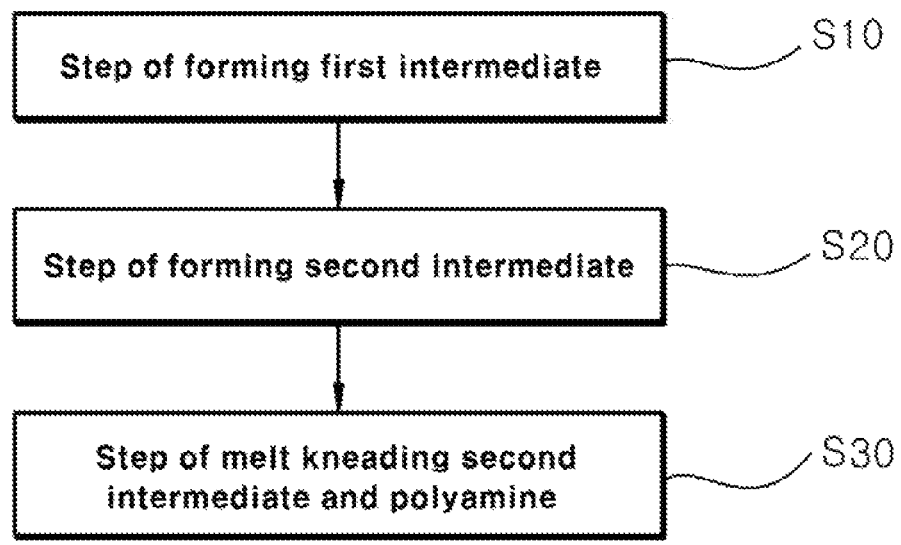
[FIG. 2]
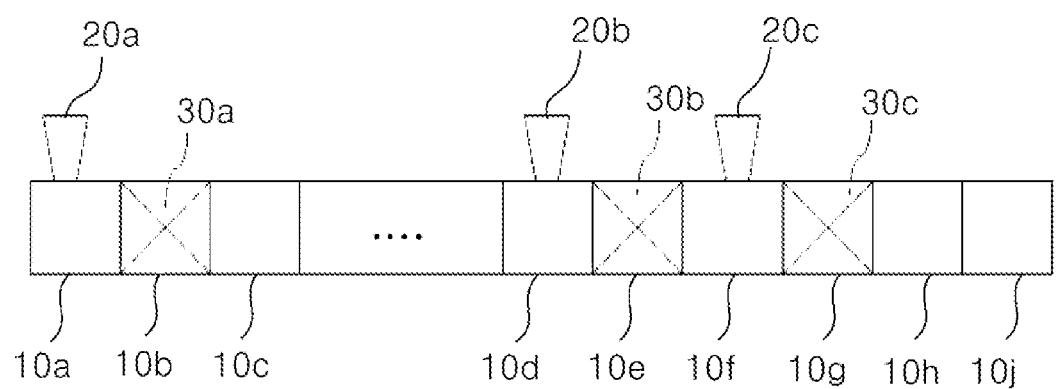

POLYAMIDE/POLYPHENYLENE ETHER RESIN COMPOSITION, AND VEHICLE MOLDED PRODUCT PREPARED THEREFROM

CROSS-REFERENCE TO RELATED APPLICATIONS

This application claims priority to and the benefit of International Application No. PCT/KR2016/013243, filed Nov. 17, 2016, which published as WO 2017/116004 on Jul. 6, 2017; and Korean Patent Application No. 10-2015-0191446, filed in the Korean Intellectual Property Office on Dec. 31, 2015, the entire disclosure of each of which is incorporated herein by reference.

TECHNICAL FIELD

The present invention relates to a polyamide/polyphenylene ether resin composition and a vehicular molded product prepared therefrom, and, more particularly, to a polyamide/polyphenylene ether resin composition having high impact resistance and adhesion with respect to melamine paints and/or acrylic paints, and a vehicular molded product prepared therefrom.

BACKGROUND ART

Plastic materials have various advantages, such as lightness, design flexibility and moldability, despite lower thermal resistance and flame resistance than metals or ceramics, and thus are widely used as industrial materials in a variety of products from daily supplies to industrial fields including automobiles and electric/electronic products.

There are various types of plastic materials from commodity plastics to engineering plastics that are widely used in various fields requiring various functions and performances.

Among these plastic materials, polyphenylene ether has excellent electrical and mechanical properties and high thermal deflection temperature to be used as engineering plastics in various fields.

Polyphenylene ether was developed by General Electric in the U.S.A. and is used in the form of blends with high impact resistance polystyrenes as useful industrial materials, based on excellent thermal resistance thereof. Recently, the polyphenylene ether is used in alloy form, such as a polyamide/polyphenylene ether alloy, obtained by adding a compatibilizer as a third component to a polyamide/polyphenylene ether, followed by reaction extrusion for compatibilization of non-compatible blends through a chemical process.

Particularly, the polyamide/polyphenylene ether can effectively remedy shortcomings of each resin component to exhibit good balance between thermal resistance, impact resistance and chemical resistance, and is thus applied to exterior components of vehicles, such as a wheel cap, a junction box, and the like, and engine compartment components of automobiles.

Recently, there is a need for a plastic material for exterior components which allows on-line electrostatic painting such that electrostatic painting can be simultaneously performed on the plastic material and other metal components. In order to satisfy such a need, a conductive polyamide/polyphenylene ether resin developed by adding conductive fillers such as carbon fibers or carbon black to the polyamide/polyphenylene ether and is applied to automobile fender components.

Development of the conductive polyamide/polyphenylene ether resin allows plastic exterior components to be subjected to electrostatic painting simultaneously with other metal material components, thereby eliminating a need for an additional painting process and thus achieving reduction in production costs.

However, despite good adhesion to urethane paints used in on-line electrostatic painting for automobiles, such a typical conductive polyamide/polyphenylene ether resin exhibits insufficient adhesion to melamine or acrylic paints, thereby limiting the kind of available paint.

Japanese Unexamined Patent Publication No. 2005-281616 (Patent Document 1) discloses a technique for improving paint adhesion by adding a soluble aluminate metal salt to a resin composition comprising a polyamide/polyphenylene ether resin and a compatibilizer. However, this technique does not secure sufficient improvement in adhesion to melamine paints or acrylic paints, despite improvement in adhesion to acrylic urethane paints.

Japanese Patent No. 3,385,774 (Patent Document 2) discloses a technique for improving adhesion to melamine paints and acrylic paints by melting and mixing polyamide, polyphenylene ether, and polyamine resins. However, since the resin composition of this patent is prepared by simultaneously melting and mixing the polyamine, the polyamide, the polyphenylene ether, and a compatibilizer, the polyamine reacts with the compatibilizer instead of the polyamide to reduce the content of the polyphenylene ether-compatibilizer-polyamide copolymer in the resin composition, thereby reducing impact resistance. As a result, the resin composition of this patent is not suitable for automobile fender components.

Therefore, there is a need for development of a polyamide/polyphenylene ether resin composition that has good adhesion to melamine paints and acrylic paints while exhibiting high impact resistance.

DISCLOSURE

Technical Problem

It is one aspect of the present invention to provide a polyamide/polyphenylene ether resin composition that has good adhesion to melamine paints and acrylic paints while exhibiting high impact resistance.

It is another aspect of the present invention to provide a vehicular molded product produced from the polyamide/polyphenylene ether resin composition.

It is a further aspect of the present invention to provide a method of preparing a polyamide/polyphenylene ether resin composition that has good adhesion to melamine paints and acrylic paints while exhibiting high impact resistance.

Technical Solution

In accordance with one aspect of the present invention, there is provided a polyamide/polyphenylene ether resin composition including: a base resin including a polyphenylene ether, a polyamide and an impact modifier; a compatibilizer; and a polyamine, the polyamide/polyphenylene ether resin composition having a notched Izod impact strength of about 12 kJ/m$^2$ or more, as measured at 23° C. in accordance with the ISO 180 standard and allowing about 5% or less of the total number of checkerboard lattices to be peeled off in a 1 mm-gap checkerboard pattern test for testing adhesive strength to acrylic paints and melamine paints in accordance with JIS K5600-5-6.

The polyamine may be present in an amount of about 0.3 parts by weight to about 5 parts by weight relative to 100 parts by weight of the base resin, and the compatibilizer may be present in an amount of about 0.1 parts by weight to about 5 parts by weight relative to 100 parts by weight of the base resin.

The base resin may include about 20 wt % to about 60 wt % of the polyphenylene ether, about 30 wt % to about 70 wt % of the polyamide, and about 1 wt % to about 30 wt % of the impact modifier.

The polyphenylene ether may include at least one of poly(2,6-dimethyl-1,4-phenylene)ether; poly(2,6-diethyl-1,4-phenylene)ether; poly(2,6-dipropyl-1,4-phenylene)ether; poly(2-methyl-6-ethyl-1,4-phenylene)ether; poly(2-methyl-6-propyl-1,4-phenylene)ether; poly(2-ethyl-6-propyl-1,4-phenylene)ether; poly(2,6-diphenyl-1,4-phenylene)ether; a copolymer of poly(2,6-dimethyl-1,4-phenylene)ether and poly(2,3,6-trimethyl-1,4-phenylene)ether; a copolymer of poly(2,6-dimethyl-1,4-phenylene)ether and poly(2,3,6-triethyl-1,4-phenylene)ether; and combinations thereof.

The polyamide may include at least one of polyamide 6; polyamide 66; polyamide 46; polyamide 11; polyamide 12; polyamide 610; polyamide 612; polyamide 6/66; polyamide 6/612; polyamide MXD6; polyamide 6/MXD6; polyamide 66/MXD6; polyamide 6T; polyamide 6I; polyamide 6/6T; polyamide 6/6I; polyamide 66/6T; polyamide 66/6I; polyamide 6/6T/6I; polyamide 66/6T/6I; polyamide 9T; polyamide 9I; polyamide 6/9T; polyamide 6/9I; polyamide 66/9T; polyamide 6/12/9T; polyamide 66/12/9T; polyamide 6/12/9I; polyamide 66/12/6I; and combinations thereof.

The impact modifier may include at least one of an aromatic vinyl elastomer, an olefin elastomer, and combinations thereof.

The compatibilizer may include at least one of maleic acid, maleic anhydride, maleic hydrazide, dichloro maleic anhydride, unsaturated dicarboxylic acid, fumaric acid, citric acid, citric anhydride, malic acid, agaric acid, and combinations thereof.

The polyamine may be a dimer acid-polyalkylene polyamine.

The polyamide/polyphenylene ether resin composition may further include conductive fillers. The conductive fillers may be present in an amount of about 0.1 parts by weight to about 10 parts by weight relative to 100 parts by weight of the base resin.

In accordance with another aspect of the present invention, there is provided a vehicular molded product produced from the polyamide/polyphenylene ether resin composition according to the present invention.

In accordance with a further aspect of the present invention, there is provided a method of preparing a polyamide/polyphenylene ether resin composition, which includes: forming a first intermediate by melt-kneading a mixture of a polyphenylene ether, a compatibilizer and an impact modifier; forming a second intermediate by melt-kneading the first intermediate and a polyamide; and melt-kneading the second intermediate and a polyamine.

Forming the first intermediate may be performed, for example, at about 260° C. to about 320° C. for about 20 seconds to about 3 minutes.

The first intermediate may include a graft copolymer of the polyphenylene ether and the compatibilizer.

Forming the second intermediate and melt-kneading the second intermediate and the polyamine may be performed, for example, at about 260° C. to about 320° C.

The method may further include removing unreacted compatibilizer after forming the first intermediate.

The method may further include removing water after at least one of forming the second intermediate and melt-kneading the second intermediate and the polyamine is performed.

Advantageous Effects

The polyamide/polyphenylene ether resin composition according to the present invention exhibits good adhesion to urethane paints, melamine paints and acrylic paints and can be advantageously applied to an electrostatic painting process using various kinds of paints.

In addition, the polyamide/polyphenylene ether resin composition according to the present invention exhibits high impact resistance and thus can be advantageously applied to components requiring high impact strength, for example, automobile fender components.

DRAWINGS

FIG. 1 is a flowchart illustrating a method of preparing a polyamide/polyphenylene ether resin composition according to the present invention.

FIG. 2 is a view of an extruder used in the preparation method according to the present invention.

BEST MODE

Hereinafter, embodiments of the present invention will be described in detail with reference to the accompanying drawings.

As a result of repeated studies to develop a polyamide/polyphenylene ether resin composition having good adhesion to various paints while exhibiting high impact resistance, the present inventors have found that such a polyamide/polyphenylene ether resin composition can be prepared by reacting a polyphenylene ether, a compatibilizer, a polyamide and a polyamine in a specific sequence, and completed the present invention.

Specifically, the polyamide/polyphenylene ether resin composition according to the present invention is prepared by reacting a polyphenylene ether and a compatibilizer to form a graft copolymer of the polyphenylene ether and the compatibilizer, melt-kneading the graft copolymer and a polyamide to form a copolymer having stable polyphenylene ether domains, and finally kneading the copolymer and a polyamine.

The polyamide/polyphenylene ether resin composition according to the present invention prepared by this method has good adhesion with respect to all of urethane paints, melamine paints and acrylic paints, and exhibits high impact resistance. Specifically, the polyamide/polyphenylene ether resin composition according to the present invention has a notched Izod impact strength of about 12 kJ/m$^2$ or more, as measured at 23° C. in accordance with ISO 180 and allows about 5% or less of the total number of checkerboard lattices to be peeled off in a 1 mm-gap checkerboard pattern test for testing adhesion to acrylic paints and melamine paints in accordance with JIS K5600-5-6. Hereinafter, the polyamide/polyphenylene ether resin composition according to the present invention and the method of preparing the same will be described.

<Resin Composition>

The polyamide/polyphenylene ether resin composition according to the present invention is a thermoplastic resin composition including a compatibilized blend of a polyphenylene ether and a polyamide, and includes a base resin including the polyphenylene ether, the polyamide and an impact modifier; a compatibilizer; and a polyamine. Herein, the compatibilized blend refers to compositions physically or chemically compatibilized with the compatibilizer. As used herein, compatibility means a degree of compatibilization, and a higher compatibility indicates a higher degree of compatibilization and a lower compatibility indicates a lower degree of compatibilization.

Base Resin

The base resin includes (A) a polyphenylene ether, (B) a polyamide, and (C) an impact modifier.

(A) Polyphenylene Ether

The polyphenylene ether (A) may include at least one of a polyphenylene ether polymer, a mixture of a polyphenylene ether polymer and an aromatic vinyl polymer, a modified polyphenylene ether polymer obtained through reaction of a polyphenylene ether polymer with a reactive monomer, and a mixture thereof.

The polyphenylene ether polymer may include at least one of poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, a copolymer of poly(2,6-dimethyl-1,4-phenylene)ether and poly(2,3,6-trimethyl-1,4-phenylene)ether, a copolymer of poly(2,6-dimethyl-1,4-phenylene)ether and poly(2,3,6-trimethyl-1,4-phenylene)ether, and combinations thereof.

Preferably, the polyphenylene ether polymer is poly(2,6-dimethyl-1,4-phenylene)ether or a copolymer of poly(2,6-dimethyl-1,4-phenylene)ether and poly(2,3,6-trimethyl-1,4-phenylene)ether, more preferably poly(2,6-dimethyl-1,4-phenylene)ether.

The aromatic vinyl polymer may include at least one of styrene, p-methylstyrene, α-methylstyrene, 4-n-propylstyrene, and combinations thereof. Preferably, styrene, α-methylstyrene, or a combination thereof is used as the aromatic vinyl compound.

The reactive monomer is a compound including an unsaturated carboxylic acid or an anhydride group thereof, or a compound capable of being modified into the unsaturated carboxylic acid or the anhydride group thereof through reaction, and may form a modified polyphenylene ether polymer through reaction with the polyphenylene ether polymer according to one embodiment of the invention.

The reactive monomer may include at least one of citric acid, citric anhydride, maleic anhydride, maleic acid, itaconic anhydride, fumaric acid, (meth)acrylic acid, (meth)acrylic acid esters, and combinations thereof.

Considering high operation temperature, the modified polyphenylene ether polymer reacted with the reactive monomer can be effectively produced through graft reaction in a melt kneaded state using a phosphite heat stabilizer, without being limited thereto.

According to one embodiment, the polyphenylene ether may have an intrinsic viscosity of about 0.2 dl/g to about 0.8 dl/g, as measured in chloroform at 25° C., without being limited thereto. Within this range of intrinsic viscosity, the resin composition can exhibit good properties in terms of thermal resistance, mechanical strength, and processability.

For example, the polyphenylene ether may have an intrinsic viscosity of about 0.3 dl/g to about 0.6 dl/g.

The polyphenylene ether may be present in an amount of about 20 wt % to about 60 wt % based on 100 wt % of the base resin. If the amount of the polyphenylene ether exceeds this range, the resin composition can suffer from deterioration in compatibility, mechanical properties, and thermal resistance. For example, polyphenylene ether may be present in an amount of about 30 wt % to about 50 wt %. For example, the polyphenylene ether may be present in an amount of about 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, or 60 wt %.

(B) Polyamide

The polyamide (B) is composed of an amino acid, a lactam, a diamine, and a dicarboxylic acid as main monomer components.

Examples of the main monomer components may include amino acids such as 6-aminocaproic acid, 11-aminoundecanoic acid, 12-aminododecanoic acid, p-aminomethyl benzoic acid; lactams such as ε-caprolactam and ω-laurolactam; aliphatic, alicyclic, and aromatic diamines such as tetramethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, 5-methylnonamethylenediamine, m-xylylenediamine, p-xylylenediamine, 1,3-bis(aminomethyl)cyclohexane, 1,4-bis(aminomethy)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; and aliphatic, alicyclic, and aromatic dicarboxylic acids such as adipic acid, suberic acid, azelaic acid, sebacic acid, dodecanoic acid, terephthalic acid, isophthalic acid, 2-chloroterephthalic acid, 2-methylterephthalic acid, 5-methylisophthalic acid, 5-sodium sulfoisophthalic acid, 2,6-naphthalene dicarboxylic acid, hexahydroterephthalic acid, and hexahydroisophthalic acid. Polyamide homopolymers or copolymers derived from these materials may be used alone or as a mixture thereof.

Specifically, examples of the polyamide may include polyamide 6, polyamide 66, polyamide 46, polyamide 11, polyamide 12, polyamide 610, polyamide 612, polyamide 6/66, polyamide 6/612, polyamide MXD6, polyamide 6/MXD6, polyamide 66/MXD6, polyamide 6T, polyamide 6I, polyamide 6/6T, polyamide 6/6I, polyamide 66/6T, polyamide 66/6I, polyamide 6/6T/6I, polyamide 66/6T/6I, polyamide 9T, polyamide 9I, polyamide 6/9T, polyamide 6/9I, polyamide 66/9T, polyamide 6/12/9T, polyamide 66/12/9T, polyamide 6/12/9I, and polyamide 66/12/6I. These substances may be used alone or as mixtures thereof prepared by mixing these substances in a suitable ratio.

The polyamide may have a melting point of about 220° C. to about 360° C., preferably about 230° C. to about 320° C., more preferably about 240° C. to about 300° C.

The polyamide may have a relative viscosity of about 2 dl/g or more, preferably about 2 dl/g to about 4 dl/g in terms of mechanical strength and thermal resistance. Herein, the relative viscosity is a value measured at 25° C. after adding 1 wt % of the polyamide to m-cresol.

The polyamide may be present in an amount of about 30 wt % to about 70 wt % based on 100 wt % of the base resin. If the content of the polyamide is not within this range, the resin composition can suffer from deterioration in flexibility, chemical resistance, and processability. For example, the polyamide may be present in an amount of about 40 wt % to about 60 wt %. For example, the polyamide may be present in an amount of about 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, or 70 wt %.

(C) Impact Modifier

The impact modifier can improve impact resistance of the polyamide/polyphenylene ether resin composition.

The impact modifier may include an aromatic vinyl elastomer (c-1), an olefin elastomer (c-2), or a combination thereof.

(c-1) Aromatic Vinyl Elastomer

The aromatic vinyl elastomer may be selected from among a block copolymer composed of an aromatic vinyl compound and a conjugated diene compound; a hydrogenated block copolymer obtained by hydrogenation of the block copolymer composed of the aromatic vinyl compound and the conjugated diene compound; a modified block copolymer obtained by modification of the block copolymer with a compound selected from the group consisting of α,β-unsaturated dicarboxylic acids and α,β-unsaturated dicarboxylic acid derivatives; and a modified hydrogenated block copolymer obtained by modification of the hydrogenated block copolymer with a compound selected from among α,β-unsaturated dicarboxylic acids and α,β-unsaturated dicarboxylic acid derivatives. These may be used alone or in combination thereof.

The aromatic vinyl compound may include at least one of styrene, p-methylstyrene, α-methylstyrene, bromostyrene, chlorostyrene, and combinations thereof. More preferably, the aromatic vinyl compound is styrene.

The aromatic vinyl elastomer is derived from the aromatic vinyl compound, and may include not only linear structures including diblock (A-B block), triblock (A-B-A block), tetrablock (A-B-A-B block) and pentablock (A-B-A-B-A block) structures, but also linear structures containing a total of six A and B blocks or more.

Specifically, examples of the aromatic vinyl elastomer may include a styrene-ethylene-butylene-styrene copolymer, a styrene-butadiene-styrene copolymer, a styrene-ethylene-propylene-styrene copolymer, a styrene-isoprene-styrene c opolymer, a styrene-ethylene copolymer, and a styrene-ethylene-butadiene-styrene copolymer. In addition, examples of the aromatic vinyl elastomer may include a modified styrene-ethylene-butylene-styrene copolymer, a modified styrene-butadiene-styrene copolymer, a modified styrene-ethylene-propylene-styrene copolymer, a modified styrene-isoprene-styrene copolymer, a modified styrene-ethylene copolymer, and a modified styrene-ethylene-butadiene-styrene copolymer, which are obtained by modification of the above substances with at least one compound selected from the group consisting of α,β-unsaturated dicarboxylic acids and α,β-unsaturated dicarboxylic acid derivatives. These may be used alone or as a mixture thereof. More preferably, the styrene elastomer is a styrene-ethylene-butylene-styrene copolymer.

(c-2) Olefin Elastomer

The olefin elastomer may be selected from the group consisting of a high density polyethylene, a low density polyethylene, a linear low density polyethylene, an ethylene-α-olefin copolymer, and combinations thereof. In addition, the olefin elastomer may be a modified high density polyethylene, a modified low density polyethylene, a modified linear low density polyethylene and a modified ethylene-α-olefin copolymer obtained through modification of these compounds with a compound selected from the group consisting of α,β-unsaturated dicarboxylic acids and α,β-unsaturated dicarboxylic acid derivatives. These may be used alone or as a mixture.

The olefin elastomer may be a copolymer obtained through polymerization of olefin monomers or a copolymer of an olefin monomer and an acrylic monomer.

The olefin monomer may be a $C_1$ to $C_{19}$ alkylene, and may be selected from, for example, ethylene, propylene, isopropylene, butylene, isobutylene, octane, and mixtures thereof.

The acrylic monomer may be an alkyl (meth)acrylic ester or a (meth)acrylic ester. Herein, the alkyl means a $C_1$ to $C_{10}$ alkyl, and examples of the alkyl (meth)acrylic ester include methyl (meth)acrylate, ethyl (meth)acrylate, propyl (meth)acrylate, and butyl (meth)acrylate. Preferably, methyl (meth)acrylate is used.

The olefin elastomer may include a reactive group capable of reacting with the polyamide. The olefin elastomer may have a structure wherein the reactive group is grafted to a main chain consisting of a copolymer of olefin monomers or a copolymer of an olefin monomer and an acrylic monomer.

As the reactive group, maleic anhydride or an epoxy group is effective.

Examples of the olefin elastomer including the reactive group may include a maleic anhydride-grafted modified ethylene-α-olefin copolymer or a modified low density polyethylene. The olefin elastomer improves compatibility between the polyphenylene ether and the polyamide.

The impact modifier may be present in an amount of about 1 wt % to about 30 wt % based on 100 wt % of the base resin. Within this range, the impact modifier can significantly improve impact resistance of the resin composition. For example, the impact modifier may be present in an amount of about 5 wt % to about 15 wt %. For example, the impact modifier may be present in an amount of about 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 wt %.

(D) Compatibilizer

The compatibilizer (D) may be a compound containing two types of functional groups or a compound capable of being modified by the compound containing two types of functional groups through reaction. One of the functional groups may be a carbon-carbon double bond or a carbon-carbon triple bond, and the other type may be selected from among a carboxyl group, an acid anhydride, an epoxy group, an imide group, an amide group, an ester group, an acid chloride, and functional equivalents thereof.

Examples of the compatibilizer may include maleic acid, maleic anhydride, maleic hydrazide, dichloro maleic anhydride, unsaturated dicarboxylic acid, fumaric acid, citric acid, citric anhydride, malic acid, and agaric acid. These may be used alone or as a mixture thereof.

Preferably, the compatibilizer is maleic acid, maleic anhydride, fumaric acid, citric acid, or citric anhydride. Particularly, maleic anhydride or citric anhydride is effective.

The compatibilizer or a modified compound of the compatibilizer generates a polyphenylene ether/polyamide block copolymer through reaction with the polyphenylene ether and the polyamide.

The polyphenylene ether/polyamide block copolymer is distributed at an interface between two components in the polyamide/polyphenylene ether resin composition to stabilize morphology of the resin composition. Particularly, in the morphology of the polyamide/polyphenylene ether resin composition in which the polyphenylene ether forms domains (dispersed phases) and the polyamide forms a matrix (continuous phase), it appears that the polyphenylene ether/polyamide block copolymer plays an important role in regulating the particle diameters of the domains to 1 µm, at which effective impact resistance can be obtained (Polymer Engineering and Science, 1990, vol. 30, No. 17, p. 1056-1062).

In the polyamide/polyphenylene ether resin composition, the compatibilizer may be present in an amount of about 0.1 parts by weight to about 5 parts by weight relative to 100 parts by weight of the base resin. For example, the compatibilizer may be present in an amount of about 0.1 parts by weight to about 1 part by weight. If the content of the compatibilizer is less than about 0.1 parts by weight, the resin composition can have insignificant improvement in impact resistance, and if the content of the compatibilizer exceeds 5 parts by weight, the compatibilizer can deteriorate other physical properties without improvement in impact resistance. For example, the compatibilizer may be present in an amount of about 0.1, 0.2, 0.3, 0.4, 0.5, 1, 2, 3, 4, or 5 parts by weight.

(E) Polyamine

The polyamine (E) is a component for improving adhesion to paints and may be, for example, a dimer acid-polyalkylene polyamine.

The polyamine (E) preferably has a total amine value of 200 mgKOH/g to 500 mgKOH/g. A polyamine having a total amine value of 200 mgKOH/g or more can more effectively prevent deterioration in impact resistance of the resin composition, and a polyamine having a total amine value of 500 mgKOH/g or less can secure equivalent paint adhesion even with a smaller amount of the polyamine. The polyamine (E) may be obtained from commercially available products, for example, POLYMIDE L-25-3, L-55-3, L-45-3, L-504, L-2513, and L-4051 (Sanyo Chemical Industries, Ltd.), without being limited thereto.

The polyamine (E) may be present in an amount of about 0.3 parts by weight to about 5 parts by weight relative to 100 parts by weight of the base resin. If the content of the polyamine is less than about 0.3 parts by weight, the resin composition can have insignificant improvement in impact resistance, and if the content of the polyamine exceeds about 5 parts by weight, the resin composition can suffer from deterioration in impact resistance. For example, the polyamine may be present in an amount of about 0.3, 0.4, 0.5, 1, 2, 3, 4 or 5 parts by weight.

(F) Conductive Filler

The polyamide/polyphenylene ether resin composition according to the present invention may further include conductive fillers to exhibit conductivity.

The conductive fillers may be dispersed in the polyamide/polyphenylene ether resin composition to impart conductivity thereto.

The conductive fillers may include at least one of carbon black and carbon fibrils.

Carbon black may be conductive carbon black, without being limited thereto. Examples of the carbon black may include graphite, furnace black, acetylene black, and Ketjen black, without being limited thereto.

The carbon fibrils are a fiber shape carbon material containing 90 wt % or more of carbon atoms. Preferably, the carbon fibrils are carbon nanotubes. The carbon nanotubes have a high aspect ratio and specific surface area, exhibit excellent properties in terms of mechanical properties, electrical properties, and thermal properties, and thus are evaluated as effective materials for engineering plastics.

The carbon nanotubes can be classified into single-wall, double-wall and multi-wall carbon nanotubes according to the number of walls, or can be classified into a zigzag structure, an armchair structure, and a chiral structure according to an angle at which a graphene facet is wrapped. However, it should be understood that various kinds of carbon nanotubes may be used without being limited to the kind and structures of the carbon nanotubes described above. Preferably, multi-wall carbon nanotubes are used.

The carbon nanotubes may have a diameter of about 0.5 nm to about 100 nm, preferably about 1 nm to about 10 nm, and a length of about 0.01 µm to about 100 µm, preferably about 0.5 µm to about 10 µm, without being limited thereto. Within these diameter and length ranges, the carbon nanotubes can provide further improved properties to the resin composition in terms of conductivity and processability.

Within these diameter and length ranges, the carbon nanotubes have a high aspect ratio (L/D), and may have an aspect ratio (L/D) of about 100 to about 1,000 to significantly improve conductivity of the resin composition.

The conductive fillers may be present in an amount of about 0.1 parts by weight to about 10 parts by weight relative to 100 parts by weight of the base resin. For example, the conductive fillers may be present in an amount of about 0.5 parts by weight to about 5 parts by weight. Within this content range of the conductive fillers, the resin composition can exhibit good properties in terms of conductivity and impact resistance. If the content of the conductive fillers is less than about 0.1 parts by weight, the resin composition has too low conductivity to be used for electrostatic painting, and if the content of the conductive fillers exceeds about 10 parts by weight, the resin composition can suffer from deterioration in impact resistance and is uneconomical. For example, the conductive fillers may be present in an amount of about 0.1, 0.5, 1, 2, 3, 4, 5, 6, 7, 8, 9 or 10 parts by weight.

(G) Other Components

The polyamide/polyphenylene ether resin composition according to the present invention may further include additives such as a flame retardant, a lubricant, a plasticizer, a heat stabilizer, an antioxidant, a photostabilizer, a colorant, or inorganic fillers, as needed. These additives may be used alone or as a mixture thereof depending upon properties of final molded products.

The flame retardant is a material for reducing flammability and may include at least one of a phosphate compound, a phosphite compound, a phosphonate compound, a polysiloxane compound, a phosphazene compound, a phosphinate compound, and a melamine compound, without being limited thereto.

The lubricant is a material capable of assisting in flow or movement of the resin composition by lubricating a metal surface contacting the resin composition during machining, molding or extrusion, and may be selected from any typical lubricants used in the art.

The plasticizer is a material capable of improving flexibility, machining workability or expansion of the resin composition and may be selected from any typical heat stabilizer used in the art.

The heat stabilizer is a material capable of suppressing thermal decomposition of the resin composition upon kneading or molding at high temperature, and may be selected from typical heat stabilizer used in the art.

The antioxidant is a material capable of preventing the resin composition from being decomposed and losing inherent properties thereof by suppressing or preventing chemical reaction of the resin composition with oxygen, and may include at least one of phenol, phosphite, thioether and amine antioxidants, without being limited thereto.

The photostabilizer is a material capable of suppressing or preventing color change or loss of mechanical properties of the resin composition due to decomposition of the resin composition by UV light, and may include, for example, titanium oxide.

The Colorant may be Dyes or Pigments.

The additives may be present in an amount of about 0.1 parts by weight to about 20 parts by weight relative to 100 parts by weight of the base resin. If the amount of the additives is not within this range, the conductive polyamide/polyphenylene ether resin composition can suffer from deterioration in mechanical properties and a molded article produced using the conductive polyamide/polyphenylene ether resin composition can have appearance defects.

The polyamide/polyphenylene ether resin composition according to the present invention has good adhesion with respect to various paints while exhibiting high impact resistance and thus can be advantageously applied to components requiring high impact strength, for example, automobile fender components. However, it should be understood that application of the resin composition according to the present invention is not limited thereto.

<Preparation Method>

Next, a method of preparing the polyamide/polyphenylene ether resin composition according to the present invention will be described.

FIG. 1 is a flowchart illustrating the method of preparing the polyamide/polyphenylene ether resin composition according to the present invention. Referring to FIG. 1, the method according to the present invention includes: forming a first intermediate by melt-kneading a mixture of a polyphenylene ether, a compatibilizer and an impact modifier (S10); forming a second intermediate by melt-kneading the first intermediate and a polyamide (S20); and melt-kneading the second intermediate and a polyamine (S30).

In the preparation method according to the present invention, details of components of the polyamide/polyphenylene ether resin composition are the same as those described above.

First, the mixture of the polyphenylene ether, the compatibilizer and the impact modifier is melt-kneaded (Step S10). Here, in Step S10, melt kneading may be performed, for example, at about 260° C. to about 320° C., preferably about 280° C. to about 320° C., more preferably about 290° C. to about 310° C. In addition, in Step S10, melt kneading may be performed for about 20 seconds to about 3 minutes. Through melt kneading in Step S10, the polyphenylene ether reacts with the compatibilizer to form a first intermediate including a graft copolymer of the polyphenylene ether and the compatibilizer.

The Mixture may further include Conductive Fillers and/or Additives.

The method may further include removing unreacted compatibilizer after formation of the first intermediate, as needed. Removal of the unreacted compatibilizer may be performed using, for example, a vacuum vent provided to an extruder. By removal of the unreacted compatibilizer, it is possible to prevent generation of byproducts through reaction between a polyamine and the compatibilizer upon addition of the polyamine to the mixture.

Next, a polyamide is added to the first intermediate, followed by melt kneading (Step S20). In Step S20, melt kneading may be performed, for example, at about 260° C. to about 320° C., preferably about 260° C. to about 300° C., more preferably about 270° C. to about 290° C. Through melt kneading in Step S20, the polyamide reacts with the graft copolymer of the polyphenylene ether and the compatibilizer to form a second intermediate including a polyphenylene ether-compatibilizer-polyamide copolymer.

Next, the polyamine is added to the second intermediate, followed by melt kneading (Step S30). In Step S30, melt kneading may be performed, for example, at about 260° C. to about 320° C., preferably about 260° C. to about 300° C., more preferably about 270° C. to about 290° C. Through melt kneading in Step S30, the polyphenylene ether-compatibilizer-polyamide copolymer is blended with the polyamine.

The method may further include removing water generated during reaction after Step S20 and/or Step S30. Here, the step of removing water may be performed using, for example, a vacuum vent provided to the extruder.

As such, in the preparation method according to the present invention, the components of the resin composition are added over time in accordance with a specific sequence, thereby minimizing deterioration in impact resistance while improving adhesion to paints through control of the reaction sequence. Specifically, in the preparation method according to the present invention, since the graft copolymer reacts with the polyamide to form the copolymer after formation of the graft copolymer of the polyphenylene ether and the compatibilizer, stable polyphenylene ether domains can be formed, and since the polyamine is melt kneaded after formation of the polyphenylene ether-compatibilizer-polyamide copolymer, it is possible to improve adhesion to melamine paints and/or acrylic paints while minimizing deterioration in impact strength of the resin composition due to reaction of the compatibilizer with the polyamine instead of the polyamide.

In one embodiment, the preparation method may be performed by melt kneading while adding the components of the resin composition in a specific sequence using an extruder including a plurality of raw supply ports and a plurality of barrels.

FIG. 2 is a view of an extruder used in the preparation method according to the present invention.

Referring to FIG. 2, the extruder includes a plurality of barrels 10a to 10j and a plurality of feeding ports 20a to 20c, in which some barrels 10b, 10e, 10g are provided with kneading screws 30a, 30b, 30c for kneading the composition. The method of preparing the polyamide/polyphenylene ether resin composition according to the present invention using such an extruder will be described in detail.

First, a mixture of a polyphenylene ether, a compatibilizer and an impact modifier is supplied to a first feeding port 20a disposed upstream of the extruder and is then passed through a first kneading screw 30a for melt kneading of the mixture to form a first intermediate. Then, a polyamide is supplied to a second feeding port 20b and is then passed through a second kneading screw 30b for melt kneading of the first intermediate and the polyamide to form a second intermediate. Last, a polyamine is supplied to a third feeding port 20c and is then passed through a third kneading screw 30c for melt kneading, thereby preparing the polyamide/polyphenylene ether resin composition according to the present invention.

Although the feeding ports are illustrated as having a hopper shape in FIG. 2, the present invention is not limited thereto and any suitable feeding port may be used depending upon the state of raw materials supplied thereto. For example, when a polyamine having a liquid phase at room temperature is used as a raw material, the third feeding port may be provided in the form of a liquid feeding nozzle.

Although not shown in FIG. 2, the extruder may be provided with at least one vacuum vent to remove unreacted materials or byproducts generated during reaction, preferably water.

MODE FOR INVENTION

Next, the present invention will be described in more detail with reference to some examples. It should be understood that these examples are provided for illustration only and are not to be in any way construed as limiting the present invention.

Description of details apparent to those skilled in the art will be omitted.

Details of Components used in Examples and Comparative Examples are as Follows.

(1) Polyphenylene Ether (PPE)

LXR-040C (China National Blue star Co., Ltd.) was used.

(2) Polyamide (PA)

Polyamide 66 (Rhodia 24AE1K, inherent viscosity: 1.1 dl/g, Solvay) was used.

(3) Compatibilizer (3-1) Maleic anhydride (Mitsubishi Chemical Co.) was used.

(3-2) Citric acid (Samchun Chemical Co., Ltd.) was used.

(4) Polyamine (4-1) A dimer acid-polyalkylene amine-based polyamide (POLYMIDE L-25-3, total amine value: 285 mgKOH/g, Sanyo Chemical Industries Ltd.) was used.

(4-2) A dimer acid-polyalkylene amine-based polyamide (POLYMIDE L-55-3, total amine value: 380 mgKOH/g, Sanyo Chemical Industries Ltd.) was used.

(5) Conductive Fillers (5-1) Carbon nanotubes (NANOCYL NC7000, Nanocyl S.A.) were used.

(5-2) A master batch prepared by melting 90 parts by weight of polyamide 66 supplied through an upstream feeding port of a twin-screw extruder, with a cylinder temperature set to 270° C., and supplying 10 parts by weight of Ketjen black EC-600JD (carbon black, Ketjen black International Co.) to a downstream feeding port of the twin screw extruder, followed by melt kneading was used.

(5-3) A master batch prepared by melting 95 parts by weight of polyamide 66 supplied through the upstream feeding port of the twin-screw extruder, with a cylinder temperature set to 270° C., and supplying 5 parts by weight of NANOCYL NC 7000 (Nanocyl S.A.) to the downstream feeding port of the twin screw extruder, followed by melt kneading was used.

(6) Impact Modifier (6-1) A styrene-ethylene-butylene-styrene copolymer (Kraton G1651, Kraton Polymer LLC) was used.

(6-2) A styrene-ethylene-butylene-styrene copolymer (Kraton G1650, Kraton Polymer LLC) was used.

(6-3) A maleic acid modified ethylene-octane copolymer (Fusabond N493, DuPont) was used.

(7) Stabilizer: N,N-hexane-1,6-diylbis(3-3,5-di-tert-butyl-4-hydroxyphenylpropionamide (IRGANOX 1098, BASF) was used.

Examples 1 to 16 and Comparative Examples 1 to 5

Resin compositions were prepared in pellet form by supplying components as listed in Tables 1 to 4 to a twin-screw extruder (KZW-58, Technovel Co.), followed by extrusion and kneading. The twin-screw extruder is composed of thirteen barrels, in which feeding ports are provided to the first, sixth and eighth barrels (hereinafter referred to as "Barrel 1", "Barrel 6", and "Barrel 8", respectively); vacuum vents are provided to the fifth and eleventh barrels (hereinafter referred to as "Barrel 5" and "Barrel 11", respectively); liquid feeding nozzles are provided to the sixth, eighth, and twelfth barrels (hereinafter referred to as "Barrel 6", "Barrel 8", and "Barrel 12", respectively); and kneading screw elements are provided to the third, fourth, seventh, tenth, and twelfth barrels (hereinafter referred to as "Barrel 3", "Barrel 4", "Barrel 7", "Barrel 10" and "Barrel 12", respectively).

Barrels 2 to 4 were set to have a cylinder temperature of 300° C., the other part from Barrel 5 to a die was set to have a cylinder temperature of 280° C., the screw RPM was set to 500 rpm, and the discharge amount was set to 400 kg/hr.

The supply positions and amounts of the components are as listed in Tables 1 to 4. In Tables 1 to 4, the content of each component is represented by unit of parts by weight relative to the total amount (100 parts by weight) of Components (1), (2) and (6).

On the other hand, since the polyamine (4) has a liquid phase at room temperature, the polyamine (4) was supplied through the liquid feeding nozzle instead of the feeding port. The polyamide (4) was supplied after being sufficiently mixed with other raw materials when added to Barrel 1.

Property Measurement Method (1) Impact Resistance

A multipurpose specimen (Type A1) was prepared through injection molding of each of the resin compositions prepared in Examples and Comparative Examples using an injection molding machine (SELEX-TX150, Woojin Selex Co., Ltd.) under conditions of a cylinder temperature of 300° C., a mold temperature of 80° C., and a fill time of 2 seconds in accordance with ISO 20753.

A type B specimen was prepared by cutting the center of the multipurpose specimen to a length of 80 mm and notched Izod impact strength at 23° C. (unit: kJ/m$^2$) was measured on the type B specimen in accordance with ISO 180. Measurement results are shown in Tables 1 to 4.

(2) Evaluation of Paint Adhesion

A flat specimen (100 mm×100 mm×2 mm) was prepared through injection molding of each of the resin compositions prepared in Examples and Comparative Examples using an injection molding machine (SELEX-TX150, Woojin Selex Co., Ltd.) under conditions of a cylinder temperature of 300° C., a mold temperature of 120° C., and a fill time of 2 seconds.

Each of the following paints (a-1), (a-2) and (a-3) was sprayed to a coat thickness of 30 μm onto the flat specimen with an exclusive curing agent and an exclusive dilution thinner. After painting, the specimen was dried at room temperature for 10 minutes, and then cured under the following heat curing conditions depending upon paints.

(a-1) An acrylic urethane resin paint (Recrack #110 white, Fusikura Kasei Co., Ltd.) was used and heat curing was performed at 80° C. for 60 minutes.

(a-2) A melamine alkyd paint (Delicon #300 White, Dai Nippon Toryo Co., Ltd.) was used and heat curing was performed at 130° C. for 20 minutes.

(a-3) An acryl melamine paint (Aclose #6000 White, Dai Nippon Toryo Co., Ltd.) was used and heat curing was performed at 150° C. for 20 minutes.

After curing, the specimen was maintained under conditions of 23° C. and 50% RH for 24 hours and was evaluated as to paint adhesion by a 1 mm-gap checkerboard pattern test in accordance with JIS K5600-5-6. Test results were classified according to the following classification.

0: Peeling was not observed.

1: Although fine peeling was observed, the number of checkerboard lattices peeled off was 5% or less of the total number of checkerboard lattices.

2: Peeling was observed and the number of checkerboard lattices peeled off was greater than 5% to 15% of the total number of checkerboard lattices.

3: Peeling was observed and the number of checkerboard lattices peeled off was greater than 15% to 35% of the total number of checkerboard lattices.

4: Peeling was observed and the number of checkerboard lattices peeled off was greater than 35% of the total number of checkerboard lattices.

Measurement results are shown in Tables 1 to 4.

TABLE 1

| Supply position | Component | Example 1 | Example 2 | Example 3 | Example 4 | Example 5 |
|---|---|---|---|---|---|---|
| Barrel 1 | (1) | 38 | 38 | 38 | 38 | 38 |
| | (6-1) | 7 | 7 | 7 | 7 | 7 |
| | (6-2) | 3 | 3 | 3 | 3 | 3 |
| | (5-1) | 1 | 1 | 1 | 1 | 1 |
| | (3-1) | 0.4 | 0.4 | 0.4 | 0.4 | 0.4 |
| | (7) | 0.5 | 0.5 | 0.5 | 0.5 | 0.5 |
| Barrel 6 | (2) | 52 | 52 | 52 | 52 | 52 |
| Barrel 8 | (4-1) | 0.3 | 0.5 | 1 | 2 | 5 |
| Izod impact strength (kJ/m$^2$) | | 20 | 20 | 19 | 19 | 18 |
| Paint adhesion | (a-1) | 0 | 0 | 0 | 0 | 0 |
| | (a-2) | 1 | 0 | 0 | 0 | 0 |
| | (a-3) | 1 | 0 | 0 | 0 | 0 |

TABLE 2

| Supply position | Component | Example 6 | Example 7 | Example 8 | Example 9 | Example 10 | Example 11 |
|---|---|---|---|---|---|---|---|
| Barrel 1 | (1) | 38 | 38 | 38 | 38 | 38 | 38 |
| | (6-1) | 7 | 7 | 7 | 7 | 7 | 7 |
| | (6-2) | 3 | 3 | 3 | 3 | 3 | 3 |
| | (5-1) | 1 | 1 | 1 | 1 | 1 | 1 |
| | (3-1) | 0.4 | 0.4 | 0.4 | 0.4 | 0.4 | 0.4 |
| | (7) | 0.5 | 0.5 | 0.5 | 0.5 | 0.5 | 0.5 |
| Barrel 6 | (2) | 52 | 52 | 52 | 52 | 52 | 52 |
| Barrel 8 | (4-1) | 0.5 | 2 | — | — | — | — |
| Barrel 12 | (4-1) | — | — | 0.5 | 2 | — | — |
| | (4-2) | — | — | — | — | 0.5 | 2 |
| Izod impact strength (kJ/m$^2$) | | 20 | 18 | 21 | 20 | 21 | 20 |
| Paint adhesion | (a-1) | 0 | 0 | 0 | 0 | 0 | 0 |
| | (a-2) | 1 | 1 | 0 | 0 | 1 | 0 |
| | (a-3) | 1 | 1 | 1 | 0 | 1 | 1 |

TABLE 3

| Supply position | Component | Example 12 | Example 13 | Example 14 | Example 15 | Example 16 |
|---|---|---|---|---|---|---|
| Barrel 1 | (1) | 38 | 38 | 38 | 38 | 38 |
| | (6-1) | 7 | 7 | 7 | 7 | 7 |
| | (6-2) | — | 3 | 3 | 3 | 3 |
| | (6-3) | 3 | — | — | — | — |
| | (5-1) | 1 | 1 | — | — | — |
| | (3-1) | 0.4 | — | 0.4 | 0.4 | 0.4 |
| | (3-2) | — | 0.8 | — | — | — |
| | (7) | 0.5 | 0.5 | 0.5 | 0.5 | 0.5 |
| Barrel 6 | (2) | 52 | 52 | 52 | 43 | 42.5 |
| | (5-2) | — | — | — | 10 | — |
| | (5-3) | — | — | — | — | 10 |

TABLE 3-continued

| Supply position | Component | Example 12 | Example 13 | Example 14 | Example 15 | Example 16 |
|---|---|---|---|---|---|---|
| Barrel 8 | (4-2) | 0.5 | 0.5 | 0.5 | 0.5 | 0.5 |
| | Izod impact strength (kJ/m$^2$) | 25 | 21 | 28 | 19 | 24 |
| Paint adhesion | (a-1) | 0 | 0 | 0 | 0 | 0 |
| | (a-2) | 1 | 0 | 0 | 1 | 0 |
| | (a-3) | 1 | 1 | 1 | 1 | 1 |

TABLE 4

| Supply position | Component | Comparative Example 1 | Comparative Example 2 | Comparative Example 3 | Comparative Example 4 | Comparative Example 5 |
|---|---|---|---|---|---|---|
| Barrel 1 | (1) | 38 | 38 | 38 | 38 | 38 |
| | (6-1) | 7 | 7 | 7 | 7 | 7 |
| | (6-2) | 3 | 3 | 3 | 3 | 3 |
| | (5-1) | 1 | 1 | 1 | 1 | 1 |
| | (3-1) | 0.4 | 0.4 | 0.4 | 0.4 | 0.4 |
| | (4-1) | — | 0.5 | 2 | — | — |
| | (7) | 0.5 | 0.5 | 0.5 | 0.5 | 0.5 |
| Barrel 6 | (2) | 52 | 52 | 52 | 52 | 52 |
| | (4-1) | — | — | — | 0.5 | 2 |
| | Izod impact strength (kJ/m$^2$) | 21 | 2.1 | 1.7 | 2.5 | 2 |
| Paint adhesion | (a-1) | 1 | 1 | 0 | 1 | 0 |
| | (a-2) | 4 | 4 | 1 | 3 | 1 |
| | (a-3) | 4 | 4 | 1 | 3 | 1 |

As shown in Tables 1 to 4, the polyamide/polyphenylene ether resin compositions of Examples 1 to 16 prepared by the preparation method according to the present invention exhibited good adhesion with respect to urethane paints, acrylic paints and melamine paints and had an Izod impact strength of greater than 12 kJ/m$^2$ indicating high impact resistance. On the contrary, it could be seen that the polyamide/polyphenylene ether resin composition of Comparative Example 1 free from a polyamine exhibited significant deterioration in adhesion to acrylic paints and melamine paints; and the polyamide/polyphenylene ether resin compositions prepared by feeding a polyamine together with a polyphenylene ether and a compatibilizer (Comparative Examples 2 and 3) and the polyamide/polyphenylene ether resin compositions prepared by feeding a polyamine together with a polyamide (Comparative Examples 4 and 5) exhibited significant deterioration in Izod impact strength.

Although the present invention has been described with reference to some embodiments, it should be understood that the present invention can be realized in various ways and that various modifications, changes, alterations, and equivalent embodiments can be made by those skilled in the art without departing from the spirit and scope of the invention. Therefore, it should be understood that the foregoing embodiments are provided for illustration only and are not to be construed in any way as limiting the invention.

The invention claimed is:

1. A polyamide/polyphenylene ether resin composition comprising: a base resin comprising a polyphenylene ether, a polyamide and an impact modifier; a compatibilizer; and a polyamine, wherein the polyamine is a dimer acid-polyalkylene polyamine,
the polyamide/polyphenylene ether resin composition having a notched Izod impact strength of about 12 kJ/m$^2$ or more, as measured at 23° C. in accordance with ISO 180, and allowing about 5% or less of the total number of checkerboard lattices to be peeled off in a 1 mm-gap checkerboard pattern test for testing adhesion to acrylic paints and melamine paints in accordance with JIS K5600-5-6.

2. The polyamide/polyphenylene ether resin composition according to claim 1, wherein the polyamide/polyphenylene ether resin composition has a notched Izod impact strength of about 16 kJ/m$^2$ to about 30 kJ/m$^2$, as measured at 23° C. in accordance with ISO 180.

3. The polyamide/polyphenylene ether resin composition according to claim 1, wherein the polyamine is present in an amount of about 0.3 parts by weight to about 5 parts by weight relative to 100 parts by weight of the base resin.

4. The polyamide/polyphenylene ether resin composition according to claim 1, wherein the compatibilizer is present in an amount of about 0.1 parts by weight to about 5 parts by weight relative to 100 parts by weight of the base resin.

5. The polyamide/polyphenylene ether resin composition according to claim 1, wherein the base resin comprises about 20 wt % to about 60 wt % of the polyphenylene ether, about 30 wt % to about 70 wt % of the polyamide, and about 1 wt % to about 30 wt % of the impact modifier.

6. The polyamide/polyphenylene ether resin composition according to claim 1, wherein the polyphenylene ether is selected from the group consisting of poly(2,6-dimethyl-1,4-phenylene)ether; poly(2,6-diethyl-1,4-phenylene)ether; poly(2,6-dipropyl-1,4-phenylene)ether; poly(2-methyl-6-ethyl-1,4-phenylene)ether; poly(2-methyl-6-propyl-1,4-phenylene)ether; poly(2-ethyl-6-propyl-1,4-phenylene)ether; poly(2,6-diphenyl-1,4-phenylene)ether; a copolymer of poly(2,6-dimethyl-1,4-phenylene)ether and poly(2,3,6-trimethyl-1,4-phenylene)ether; a copolymer of poly(2,6-dimethyl-1,4-phenylene)ether poly(2,3,6-triethyl-1,4-phenylene)ether; and combinations thereof.

7. The polyamide/polyphenylene ether resin composition according to claim 1, wherein the polyamide is selected from the group consisting of polyamide 6; polyamide 66; polyamide 46; polyamide 11; polyamide 12; polyamide 610;

polyamide 612; polyamide 6/66; polyamide 6/612; polyamide MXD6; polyamide 6/MXD6; polyamide 66/MXD6; polyamide 6T; polyamide 6I; polyamide 6/6T; polyamide 6/6I; polyamide 66/6T; polyamide 66/6I; polyamide 6/6T/6I; polyamide 66/6T/6I; polyamide 9T; polyamide 9I; polyamide 6/9T; polyamide 6/9I; polyamide 66/9T; polyamide 6/12/9T; polyamide 66/12/9T; polyamide 6/12/9I; polyamide 66/12/6I; and combinations thereof.

8. The polyamide/polyphenylene ether resin composition according to claim 1, wherein the impact modifier is selected from the group consisting of an aromatic vinyl elastomer an olefin elastomer; and combinations thereof.

9. The polyamide/polyphenylene ether resin composition according to claim 1, wherein the compatibilizer is selected from the group consisting of maleic acid, maleic anhydride, maleic hydrazide, dichloro maleic anhydride, unsaturated dicarboxylic acid, fumaric acid, citric acid, citric anhydride, malic acid, or agaric acid; and combinations thereof.

10. The polyamide/polyphenylene ether resin composition according to claim 1, further comprising conductive fillers.

11. The polyamide/polyphenylene ether resin composition according to claim 10, wherein the conductive fillers are present in an amount of about 0.1 parts by weight to about 10 parts by weight relative to 100 parts by weight of the base resin.

12. A vehicular molded product produced from the polyamide/polyphenylene ether resin composition according to claim 1.

13. A method of preparing a polyamide/polyphenylene ether resin composition, comprising:

forming a first intermediate by melt-kneading a mixture of a polyphenylene ether, a compatibilizer and an impact modifier;

forming a second intermediate by melt-kneading the first intermediate and a polyamide; and melt-kneading the second intermediate and a polyamine, wherein the polyamine is a dimer acid-polyalkylene polyamine.

14. The method according to claim 13, wherein forming the first intermediate is performed at about 260° C. to about 320° C. for about 20 seconds to about 3 minutes.

15. The method according to claim 13, wherein the first intermediate comprises a graft copolymer of the polyphenylene ether and the compatibilizer.

16. The method according to claim 13, wherein forming the second intermediate and melt-kneading the second intermediate and the polyamine are performed at about 260° C. to about 320° C.

17. The method according to claim 13, further comprising:

removing unreacted compatibilizer after forming the first intermediate.

18. The method according to claim 13, wherein forming the second intermediate and/or melt-kneading the second intermediate and the polyamine generates water, and the method further comprises:

removing water after forming the second intermediate and/or melt-kneading the second intermediate and the polyamine.

* * * * *